S. T. BROWN.
BOX-FLANGING MACHINE.
APPLICATION FILED DEC. 5, 1912.

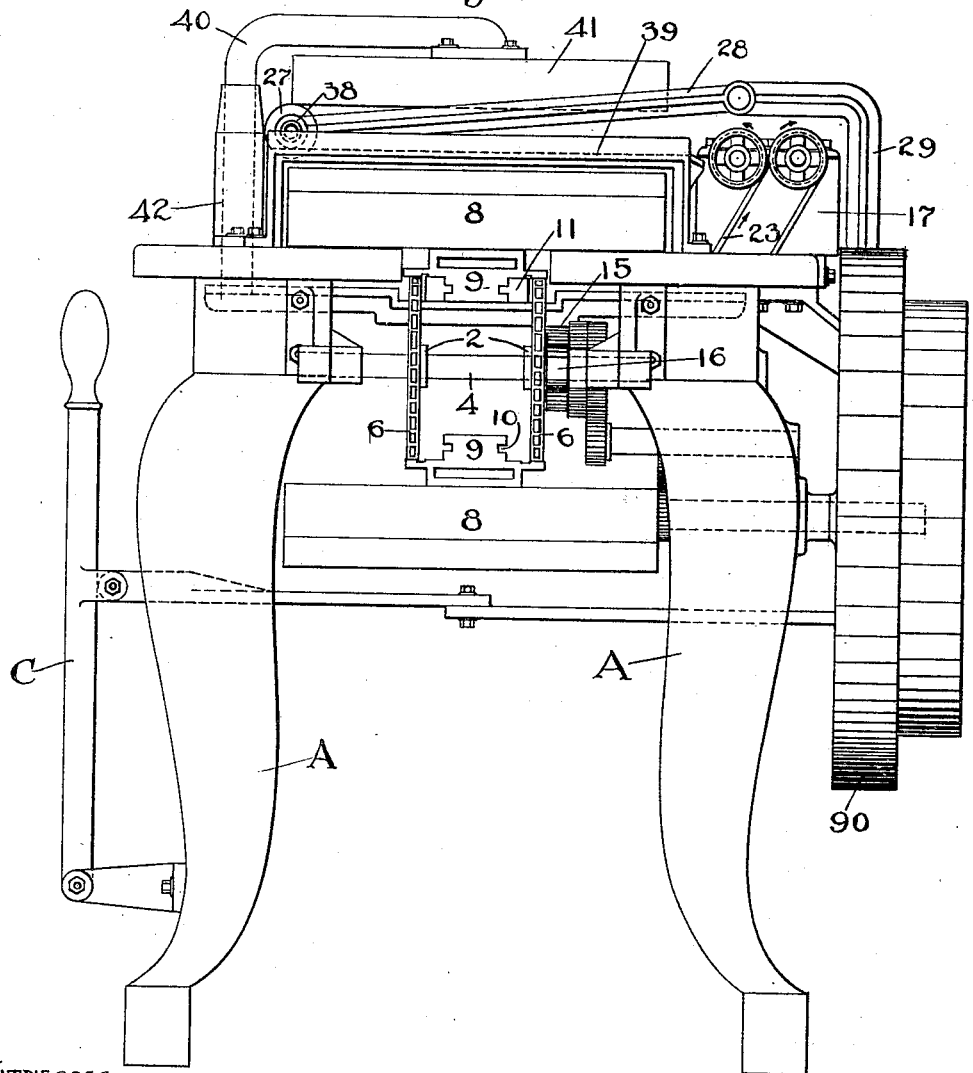

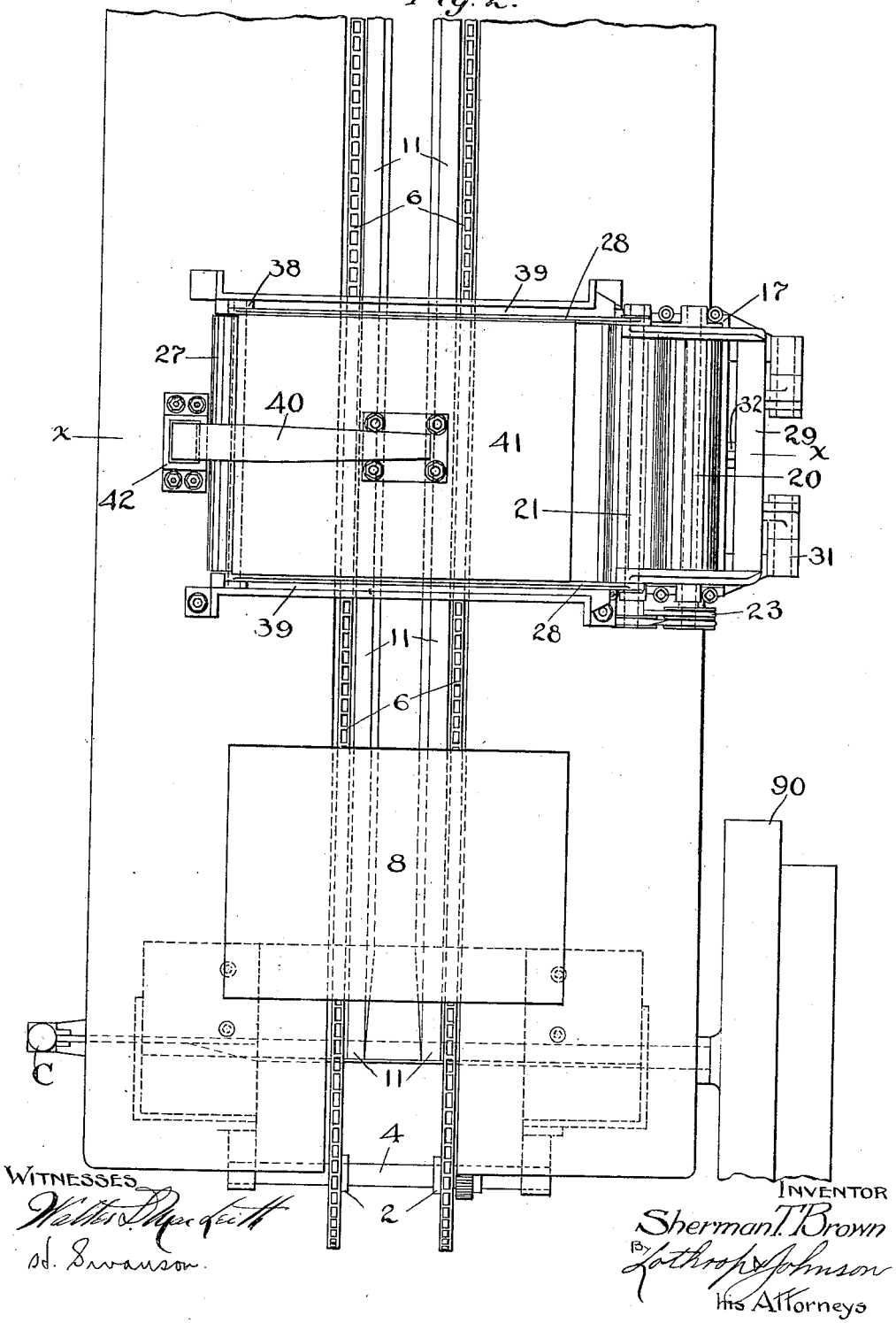

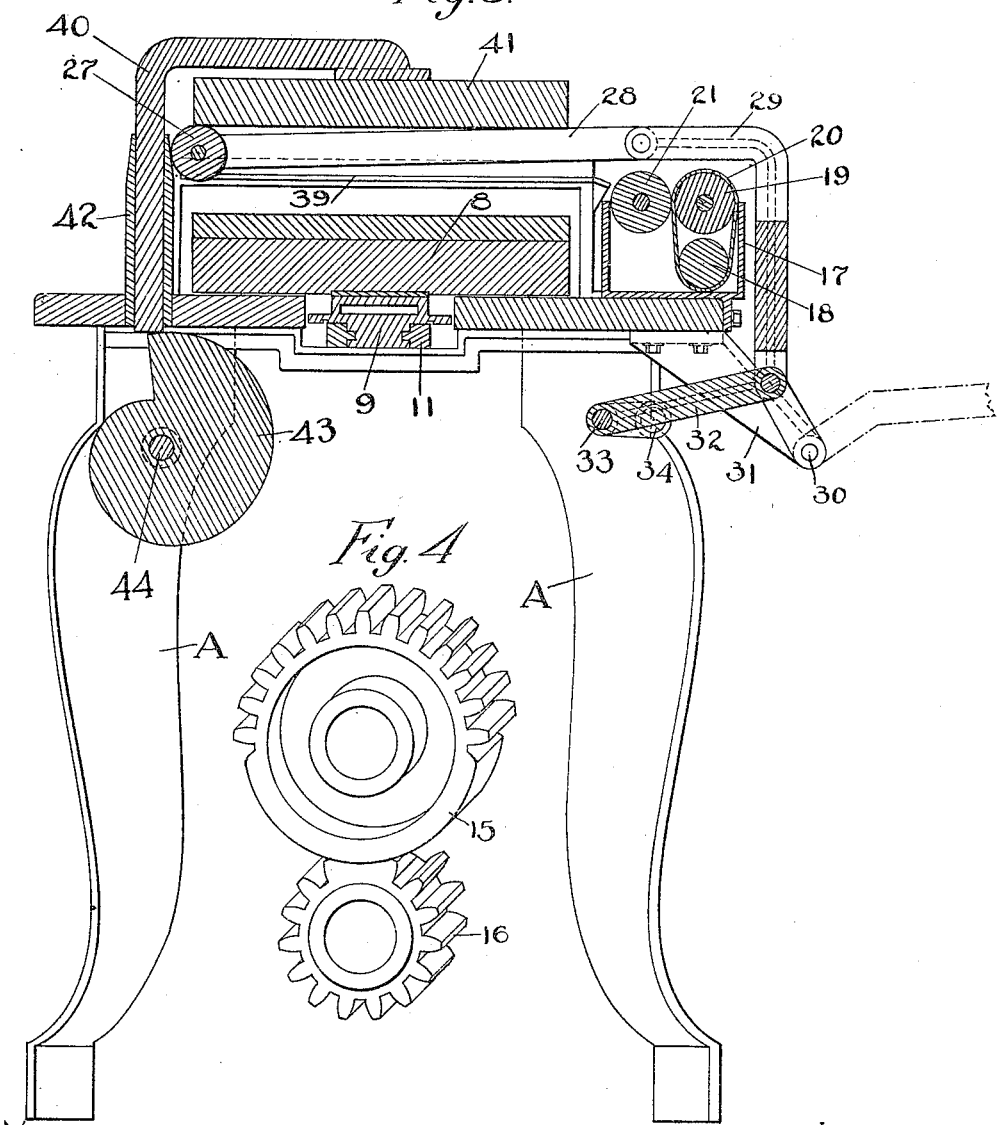

1,138,351.

Patented May 4, 1915.
16 SHEETS—SHEET 4.

WITNESSES

INVENTOR
Sherman T. Brown
By Lothrop & Johnson
his Attorneys

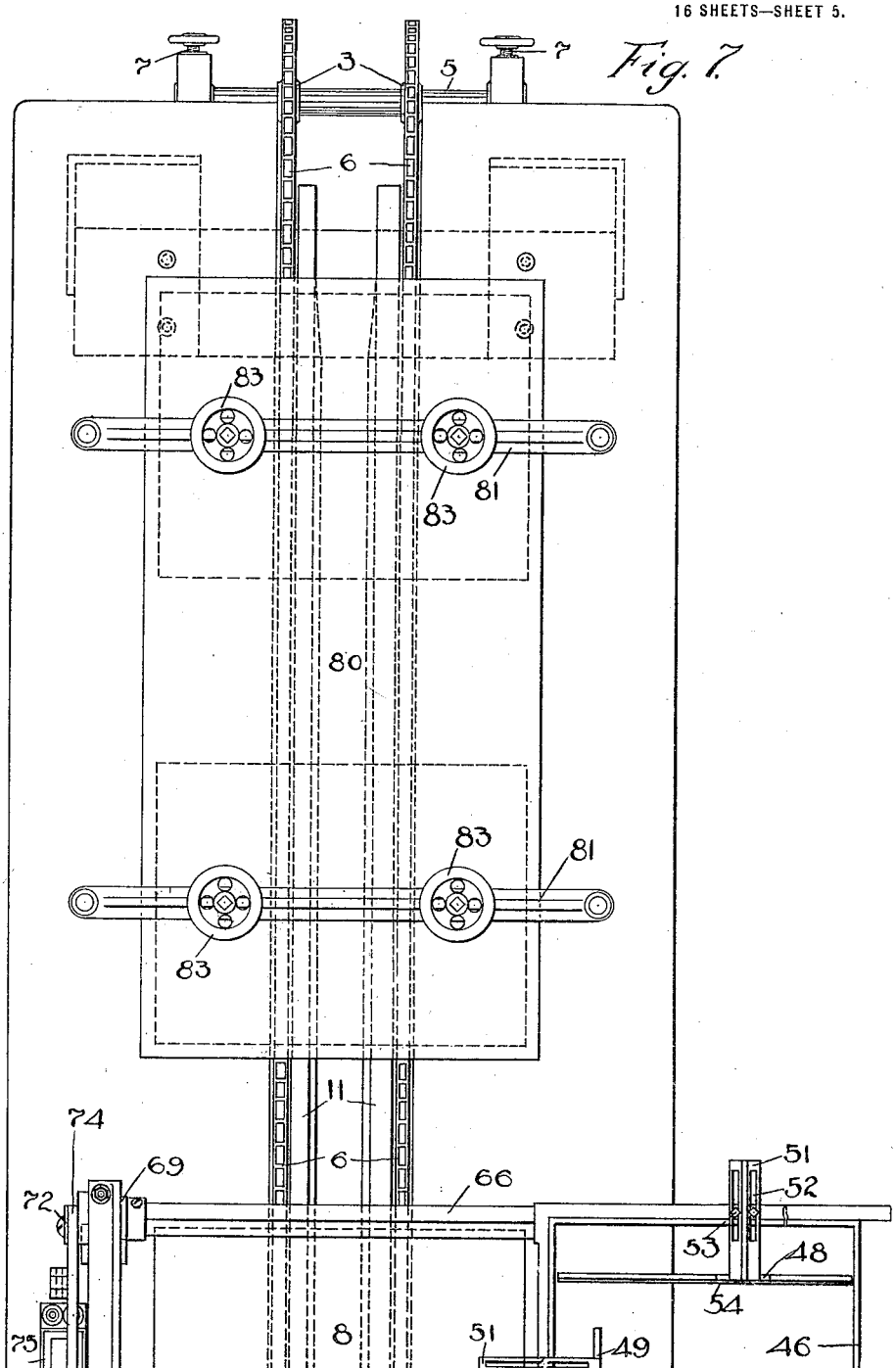

S. T. BROWN.
BOX FLANGING MACHINE.
APPLICATION FILED DEC. 5, 1912.
1,138,351.
Patented May 4, 1915.
16 SHEETS—SHEET 6.
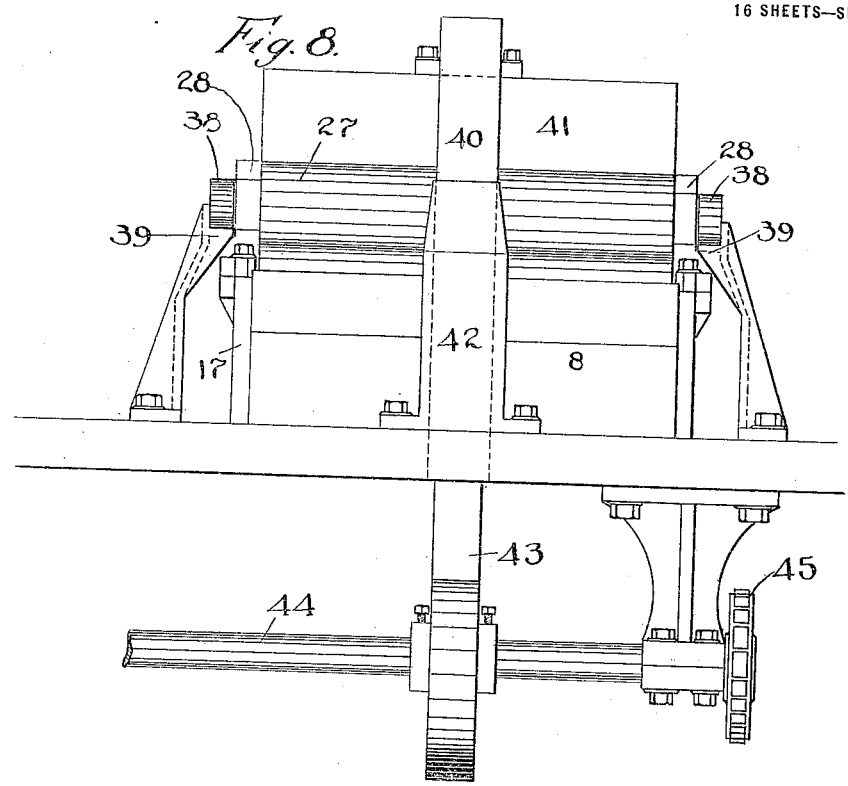
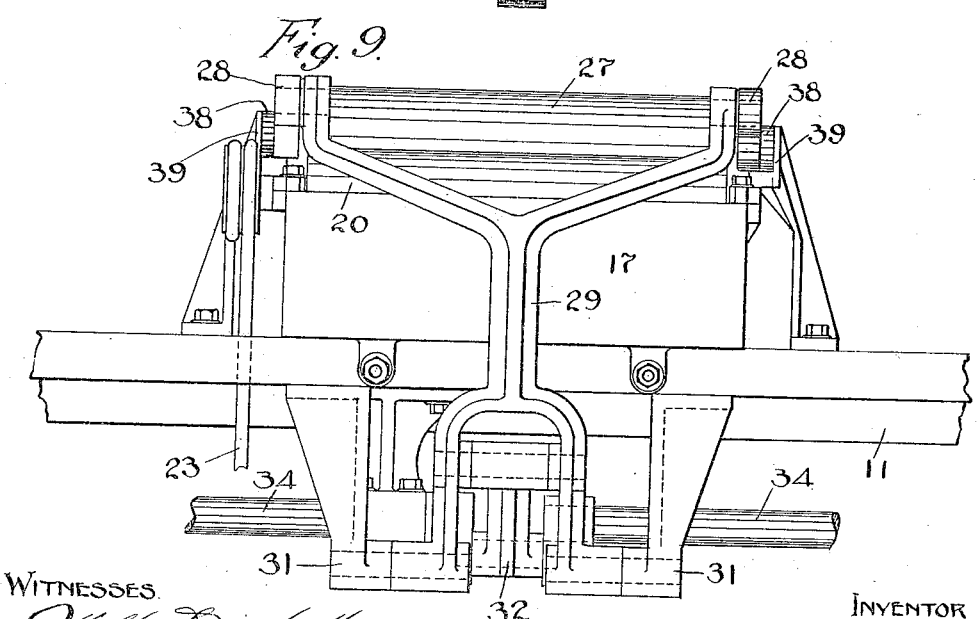
WITNESSES
Walter D. Macgeith
S. Swanson
INVENTOR
Sherman T. Brown
By Lothrop Johnson
his Attorneys

S. T. BROWN.
BOX FLANGING MACHINE.
APPLICATION FILED DEC. 5, 1912.

1,138,351.

Patented May 4, 1915.
16 SHEETS—SHEET 7.

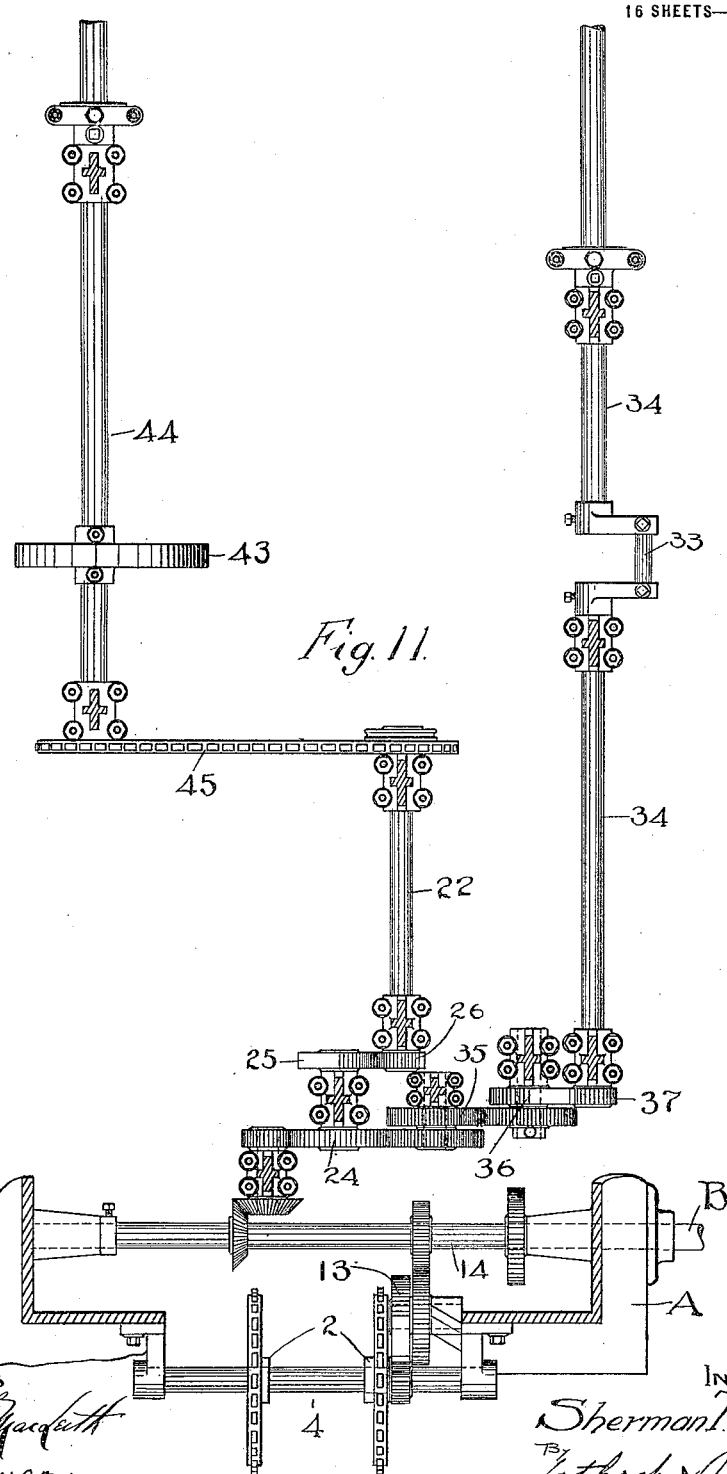

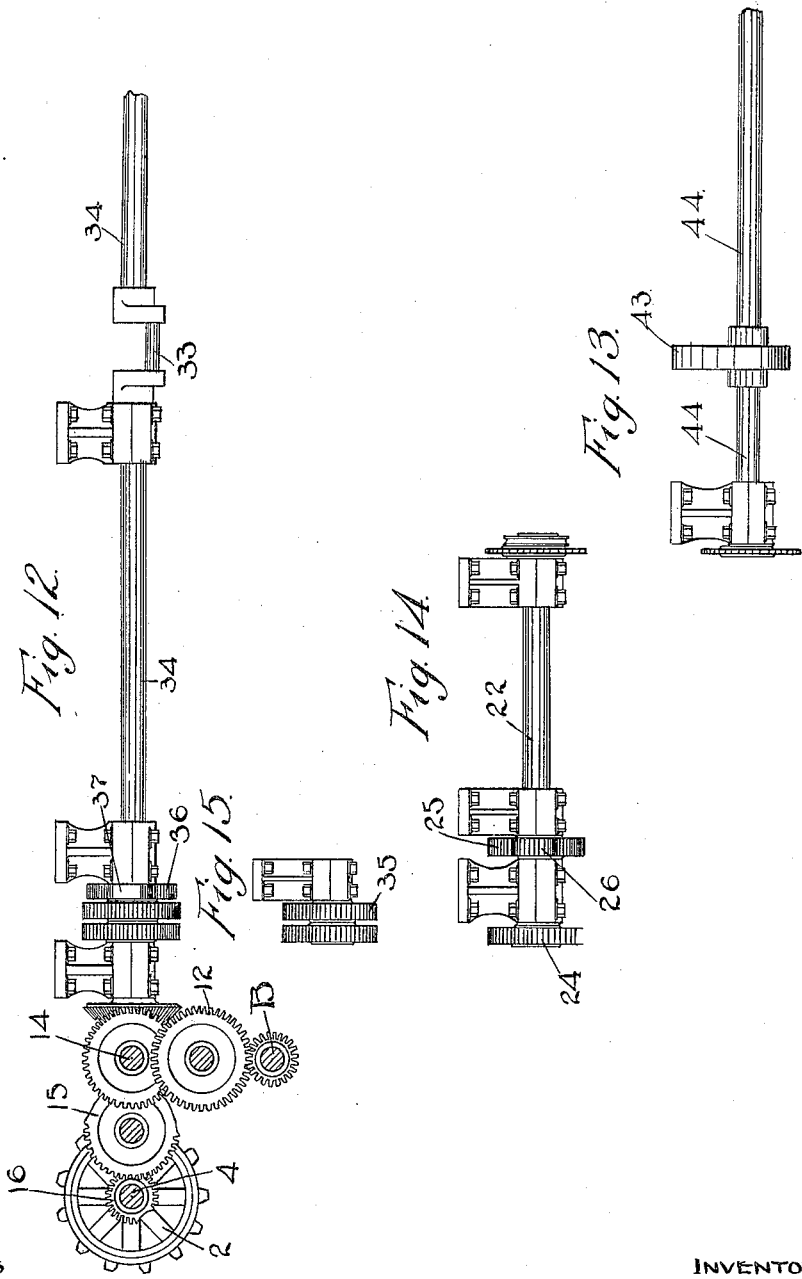

S. T. BROWN.
BOX FLANGING MACHINE.
APPLICATION FILED DEC. 5, 1912.
1,138,351.
Patented May 4, 1915.
16 SHEETS—SHEET 10.
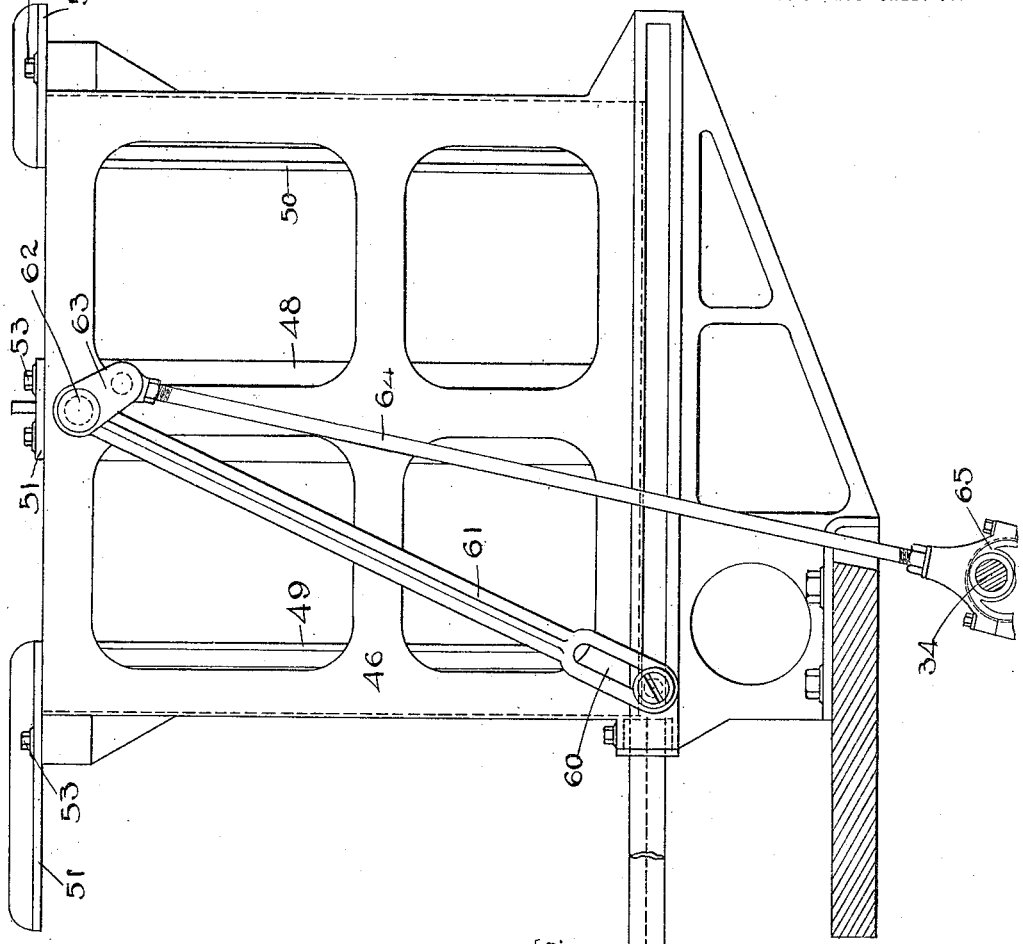
Fig. 16.
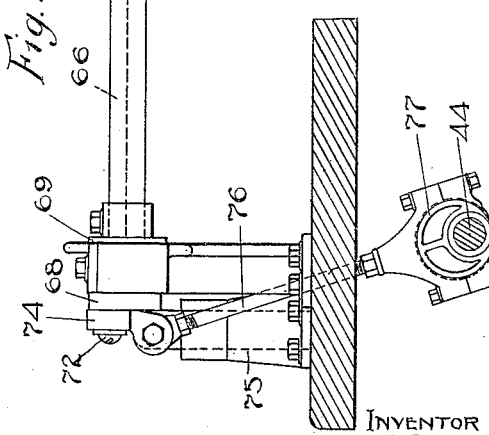
Witnesses.
Walk D Macdritt
A. Swanson
Inventor
Sherman T. Brown
By Lothrop Johnson
his Attorneys.

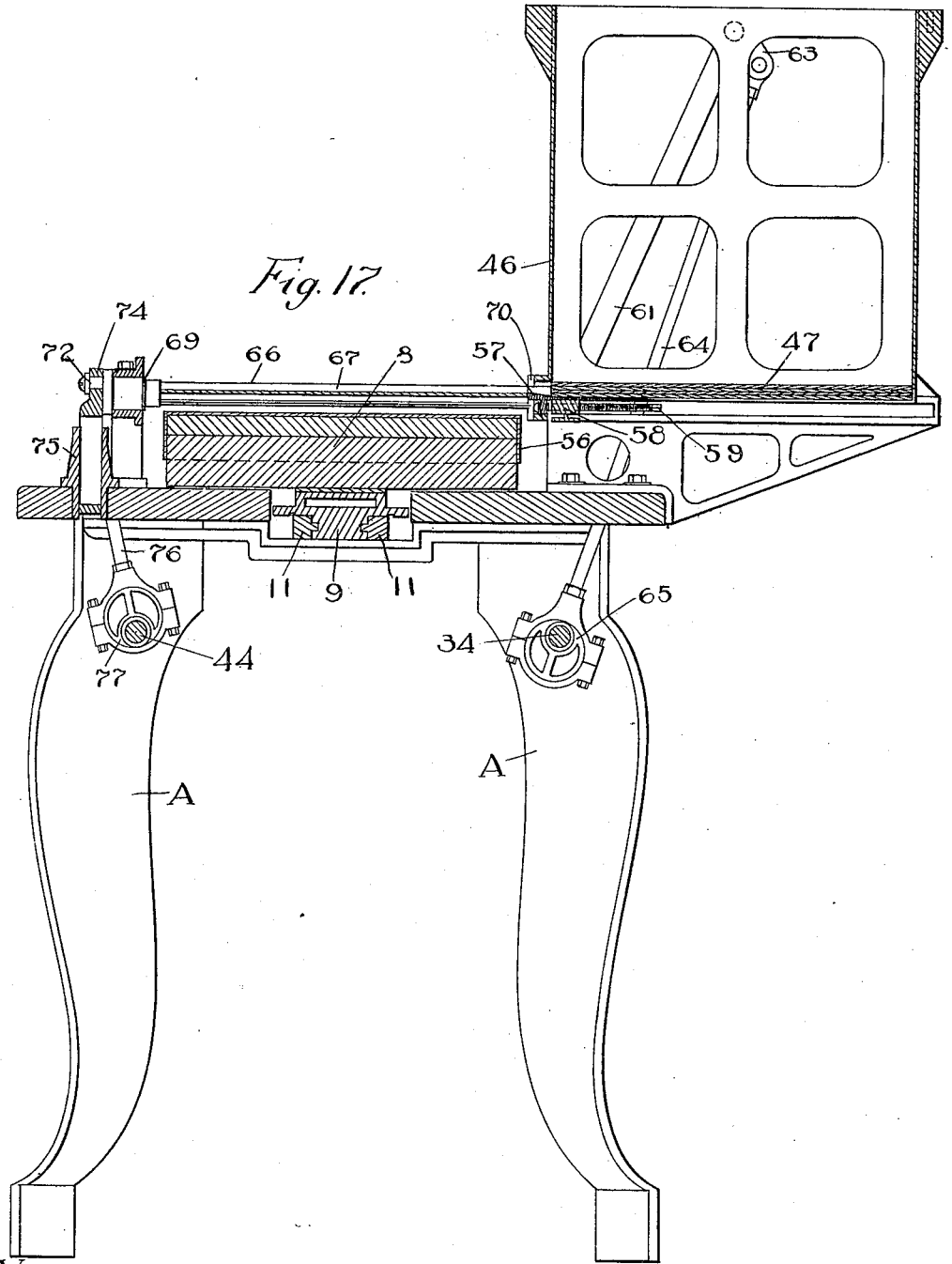

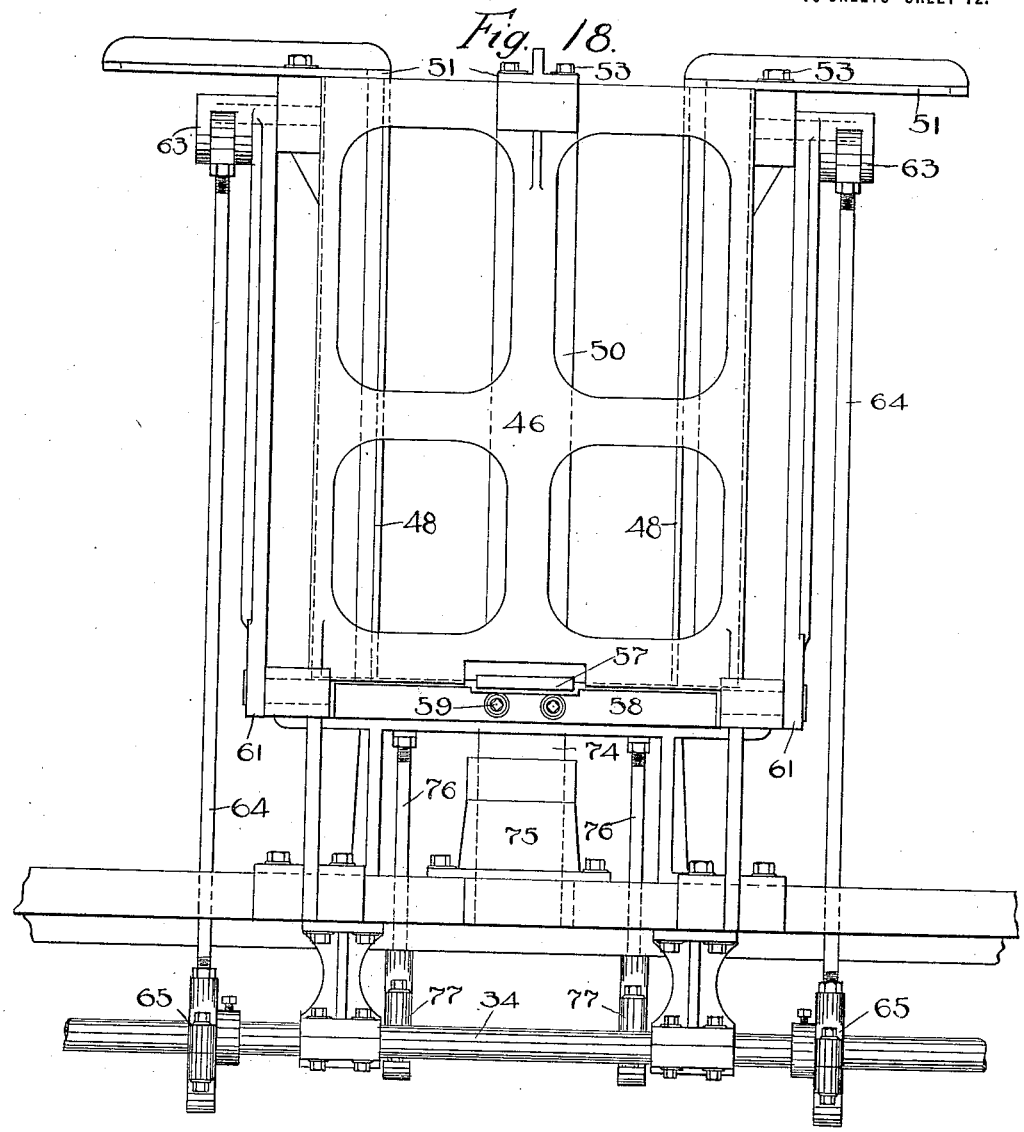

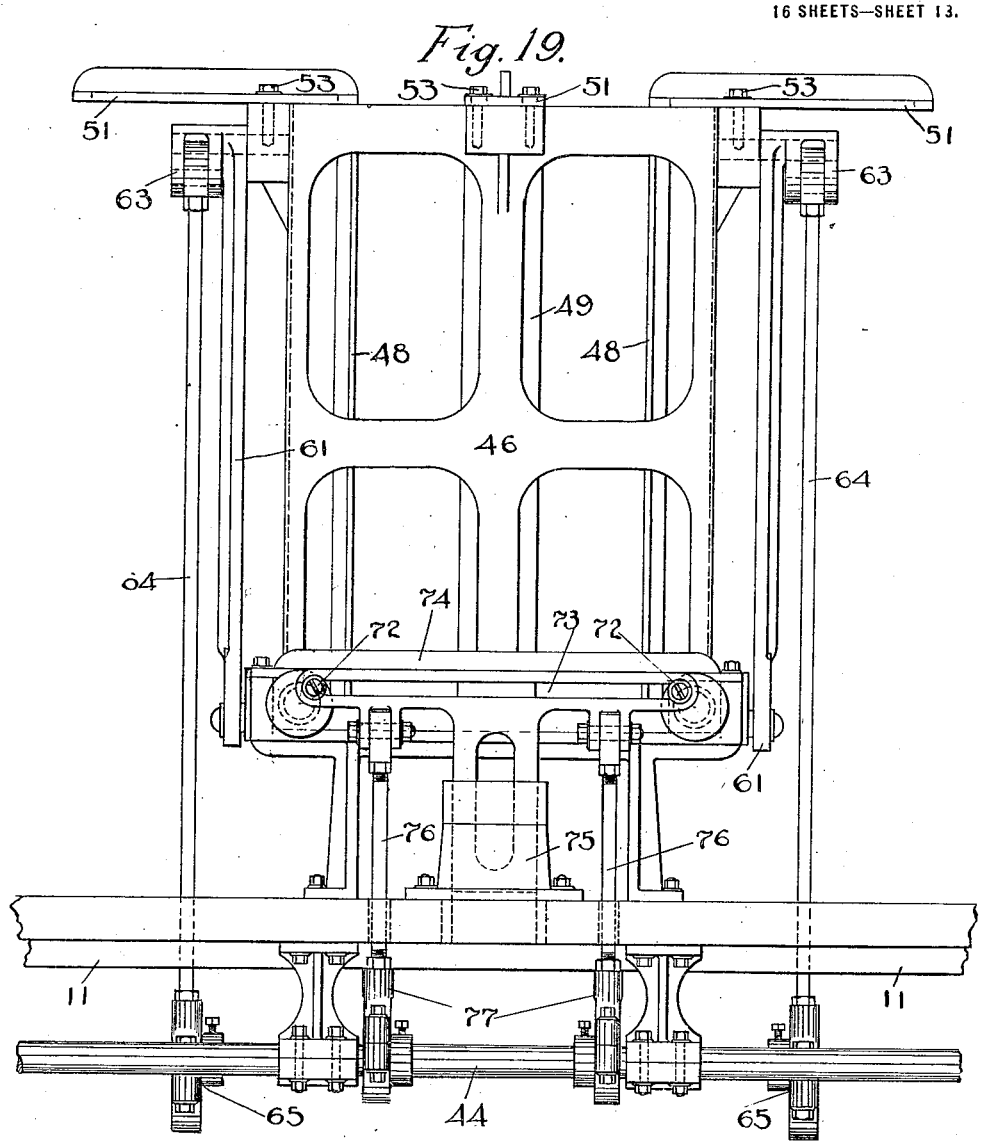

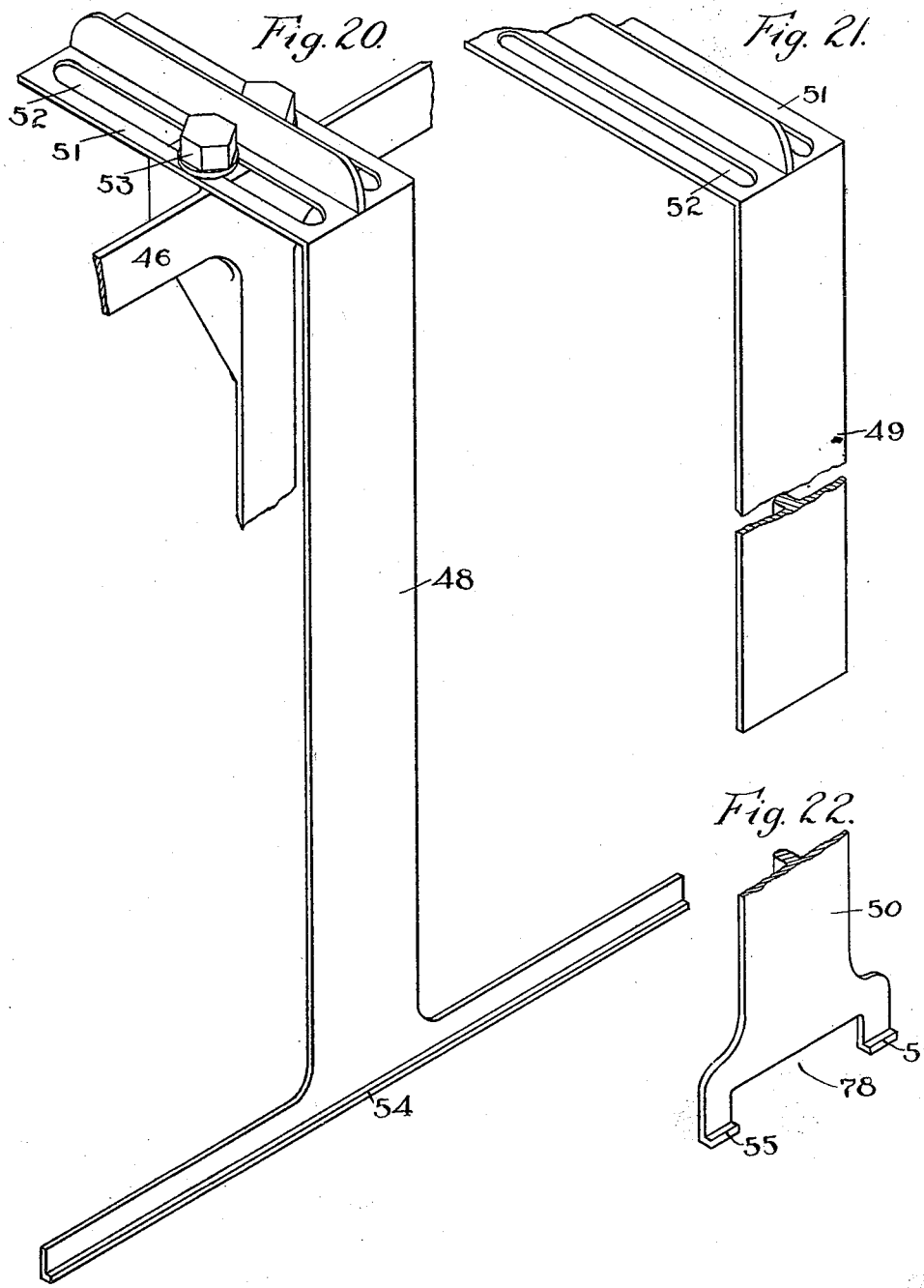

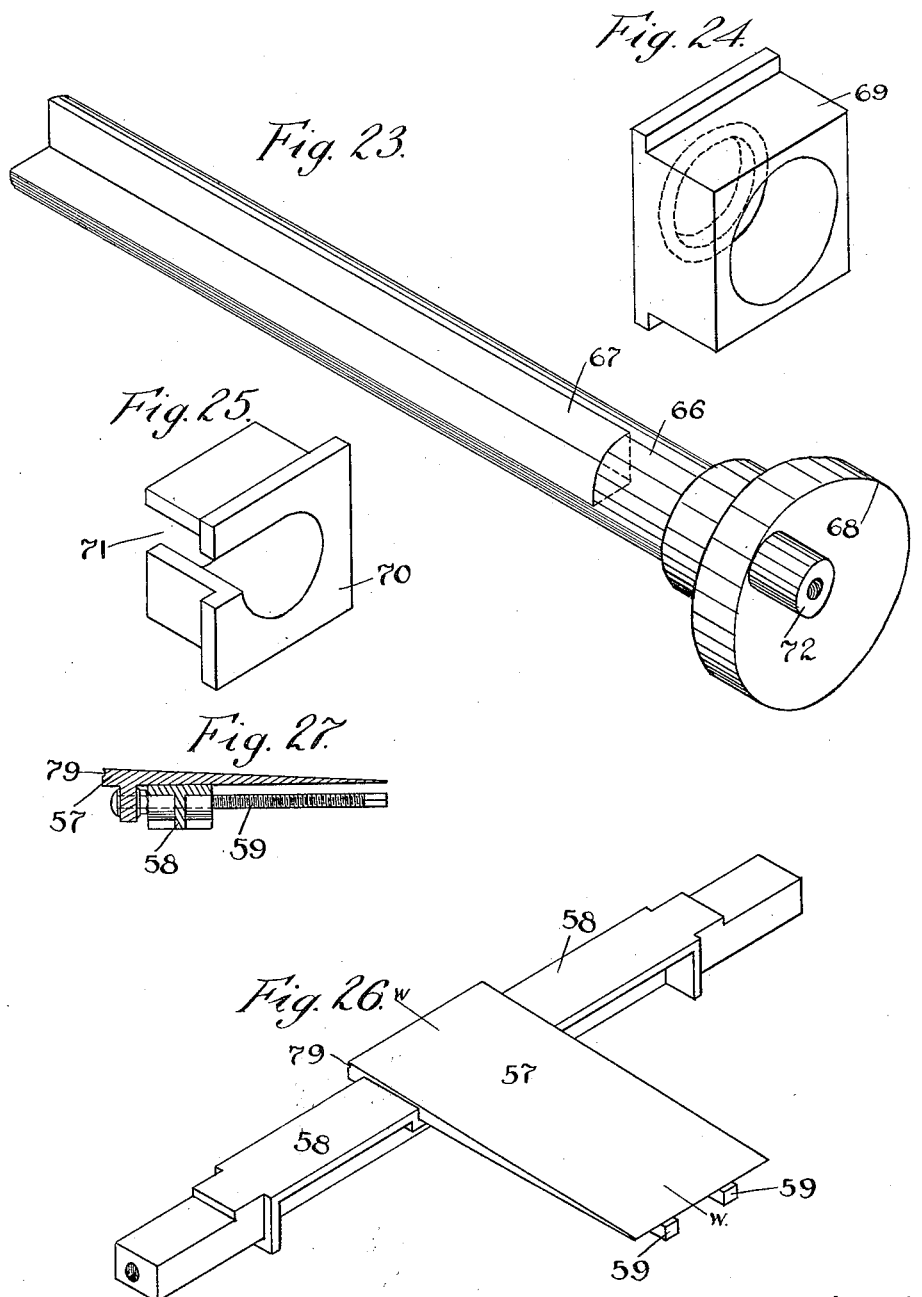

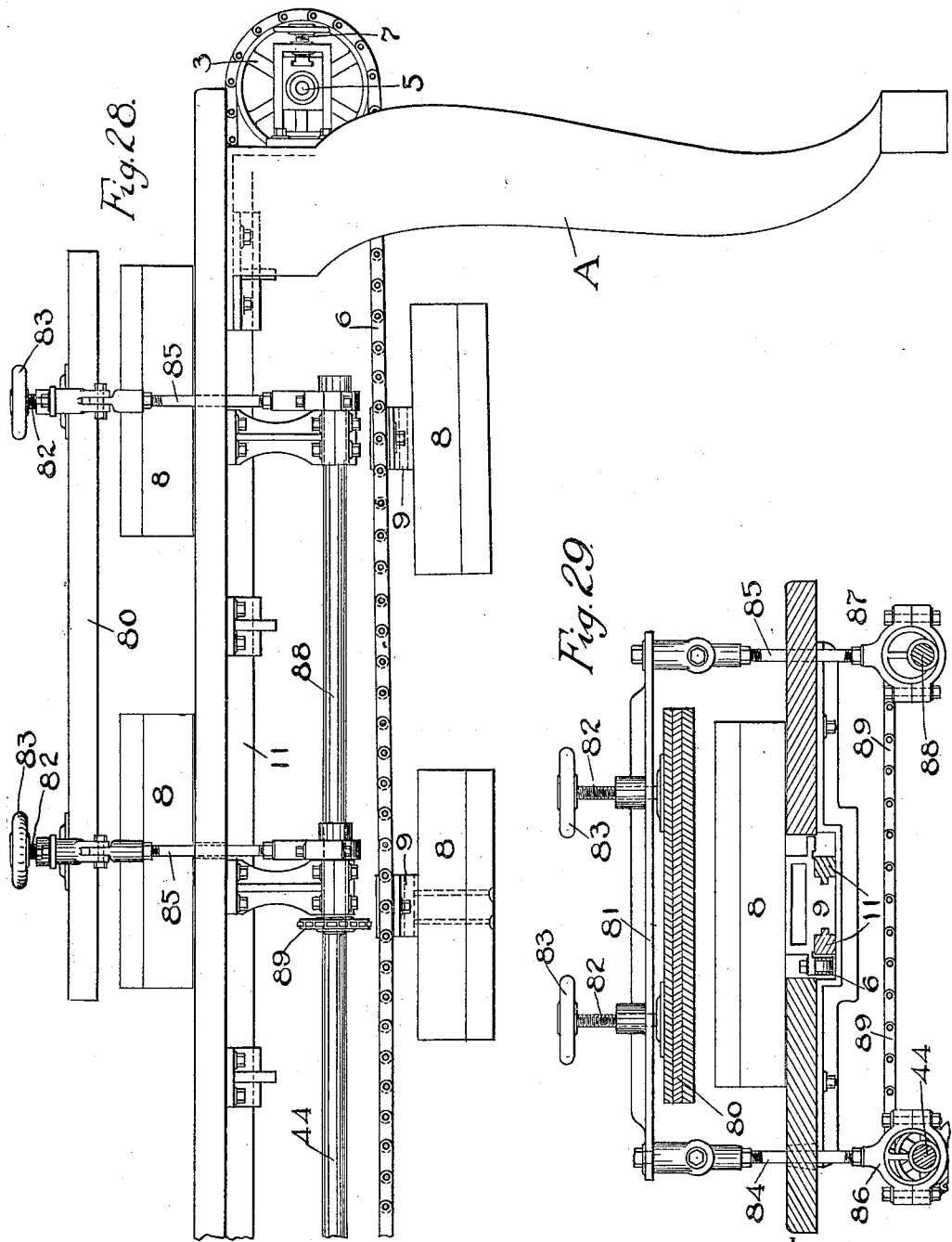

UNITED STATES PATENT OFFICE.

SHERMAN T. BROWN, OF ST. PAUL, MINNESOTA, ASSIGNOR TO BROWN MACHINERY MANUFACTURING COMPANY, OF ST. PAUL, MINNESOTA, A CORPORATION OF MINNESOTA.

BOX-FLANGING MACHINE.

1,138,351.      Specification of Letters Patent.      Patented May 4, 1915.

Application filed December 5, 1912. Serial No. 735,061.

*To all whom it may concern:*

Be it known that I, SHERMAN T. BROWN, a citizen of the United States, residing at St. Paul, in the county of Ramsey and State of Minnesota, have invented certain new and useful Improvements in Box-Flanging Machines, of which the following is a specification.

My invention relates to improvements in machines designed particularly for gluing flanges upon boxes or covers, and consists particularly in means for positioning and bringing together the component parts to be glued, and a mechanism for supplying the glue and pressing the glued parts together.

To this end the invention consists in the features of construction, combination, and arrangement of parts hereinafter described and claimed.

Figure 5:
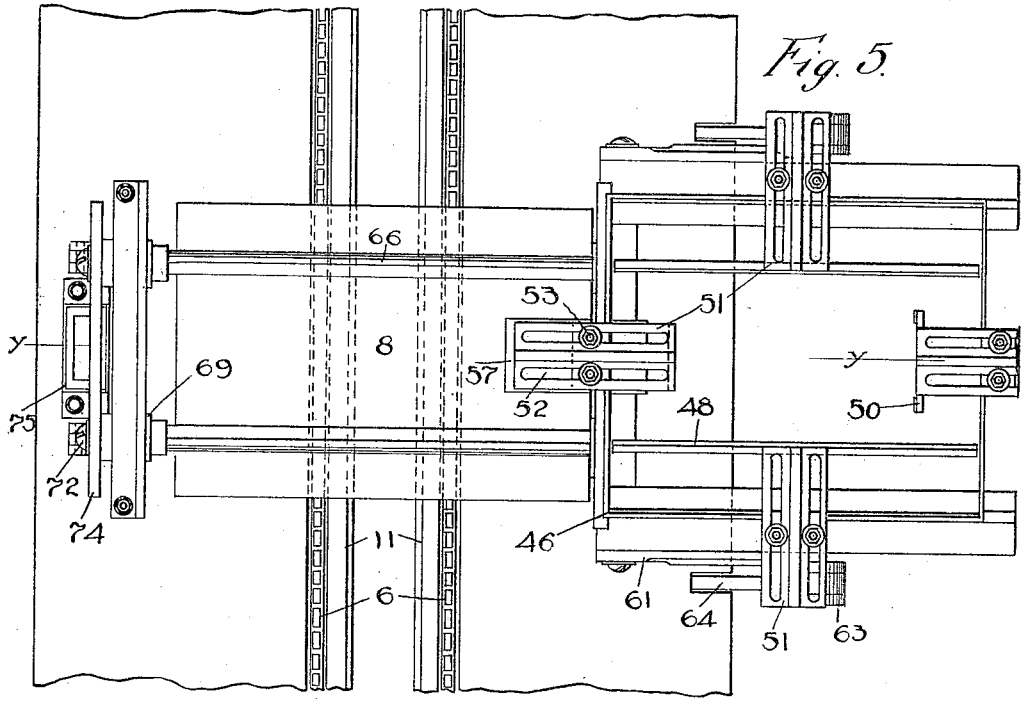
Figure 6:
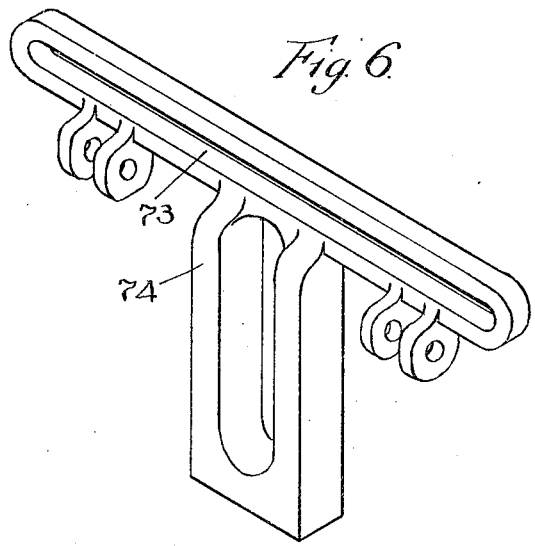
Figure 10:
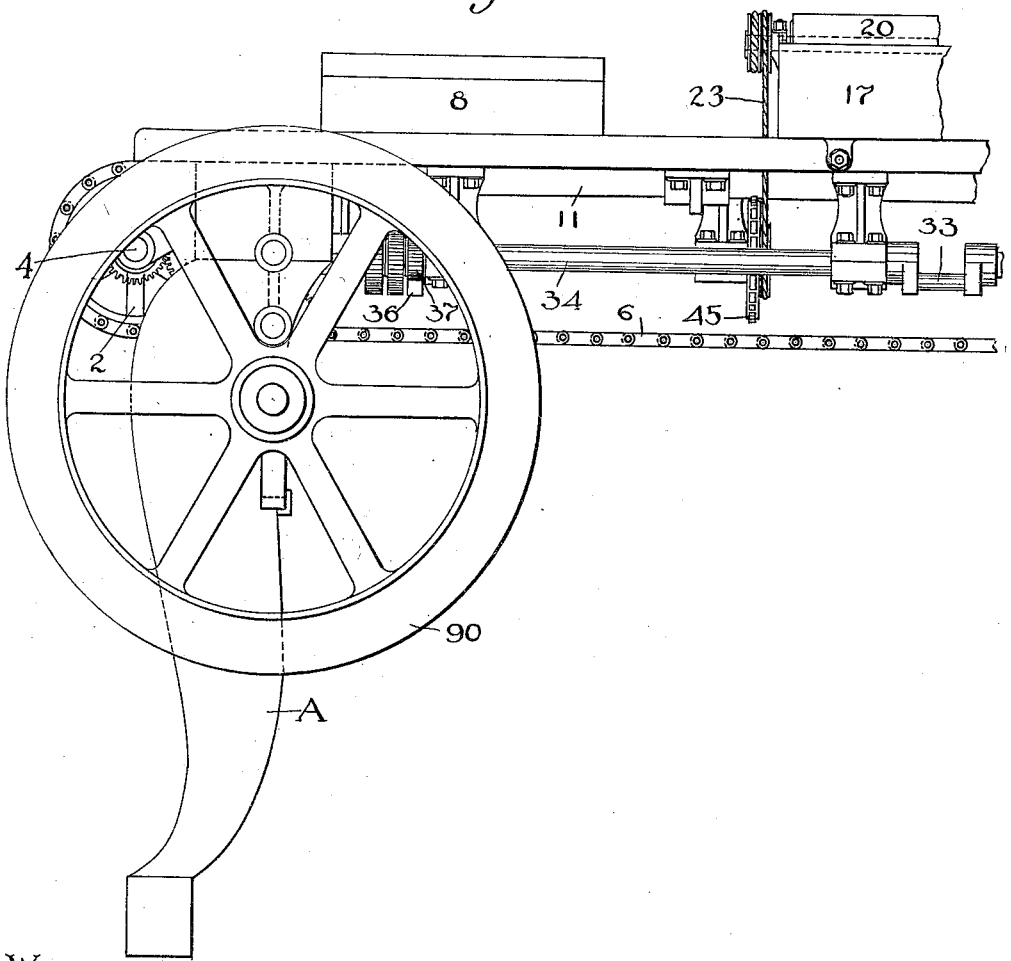

In the accompanying drawings forming part of this specification, Figure 1 is a right hand side elevation of my improved machine; Fig. 2 is a top view of the placing and gluing portion of the machine; Fig. 3 in a section on line $x$—$x$ of Fig. 2; Fig. 4 is a perspective view, intermittent gearing forming part of the driving gear; Fig. 5 is a top view of the flange placing portion of the machine; Fig. 6 is a detail of a tilting arm forming part of the mechanism shown in Fig. 5; Fig. 7 is a top view of the pressing or delivery portion of the machine; Fig. 8 is a front view of the gluing portion of the machine broken away; Fig. 9 is a rear view of the parts shown in Fig. 8; Fig. 10 is a rear view of the machine showing the placing and gluing mechanism with part of the gluing mechanism removed; Fig. 11 is a plan view of part of the operating mechanism of the machine; Fig. 12 is a rear view of part of the mechanism shown in Fig. 11; Fig. 13 is a rear view of a cam operating shaft forming part of the mechanism; Fig. 14 is a rear view of shaft mechanism associated with the shaft mechanism shown in Fig. 13; Fig. 15 is a rear view of idlers forming part of the operating mechanism; Fig. 16 is an end view of a flange holder and connected parts with part of the supporting framework shown in section; Fig. 17 is a section on line $y$—$y$ of Fig. 5, with flange positioning arms removed; Fig. 18 is a rear view of the flange holder and delivery devices; Fig. 19 is a front view of the same; Figs. 20, 21, and 22 are detail views of flanged positioning arms; Fig. 23 is a detail of a flange delivery rail; Fig. 24 is a detail of a front support; Fig. 25 is a rear support of the rail shown in Fig. 23; Fig. 26 is a detail view of a flange delivery slide; Fig. 27 is a section on line $w$—$w$ of Fig. 26; Fig. 28 is a rear view of the pressing and delivery end of the machine; and Fig. 29 is a vertical section through Fig. 28.

Referring to the drawings, A represents the supporting framework of the machine. Passing over sprockets 2 and 3 secured upon shafts 4 and 5 having journal support in the opposite ends of the machine are the gear chains 6. Arranged in connection with the supporting shaft of the sprockets 3 is a suitable take-up device 7. Secured along the carrier chains are interspaced blocks 8, the blocks being each formed with a rib 9 extending inwardly between the chains. Each rib 9 is formed with side grooves 10 to receive the rails 11 extending longitudinally of the bed of the machine, whereby to form a steady support for the blocks as they travel over the bed of the machine as indicated in Fig. 1. The shaft 4 is operated from the main shaft B through the medium of a secondary shaft 14, gearing 13 connecting the secondary shaft with the shaft 4 and step down gearing 12 between the main shaft and secondary shaft. Included within the gearing 13 are the intermittent gears 15 and 16, whereby to impart step by step travel to the carrier chains.

Supported by the framework adjacent to the feeding end of the machine is the mechanism for placing glue upon the unflanged box or cover which is placed upon the block before the same reaches the gluing apparatus. Included in the gluing apparatus is a glue holding tank 17 supported by the framework at one side of the machine. Within the tank is journaled a pair of superimposed rollers 18 and 19 over which runs a belt 20, which belt engages with an adjacently journaled roller 21. The roller 21 is actuated from the longitudinal shaft 22 having journal support below the bed of the machine a cable 23 connecting said roller and shaft. The shaft 22 has gear connection 24 with the shaft 14, the gearing 24 including intermittent gears 25 and 26, similar to the gears 15 and 16. Adapted to be reciprocated over the glue rollers 20 and 21 and inwardly over the top of the adjacent top or box supporting block is a glue roller 27 supported upon the end of an arm 28, which arm at its opposite end is pivotally supported upon an elbow 29. The elbow 29, at its lower outer end, has pivotal support 30 in brackets 31 extending downwardly and outwardly from the framework. The elbow is turned upon its pivotal support from dotted to full line position shown in Fig. 3, and vice versa by means of a link 32 connecting the elbow above its pivotal support to a knuckle 33 offset from the longitudinal shaft 34 journaled underneath the bed of the machine. The shaft 34 has gearing connection 35 with the drive shaft 14, the gearing 35 including intermittent gears 36 and 37 similar to the intermittent gears 15 and 16. Mounted on the ends of the shaft of the roller 27 are guide rollers 38 which travel upon the rails 39 extending transversely above the bed of the machine.

Slidably supported above the rails 39, through the medium of an elbow arm 40, is a glue receiving plate 41. The downward extension of the arm 40 slides in a guideway 42 and is adapted to be engaged at its lower end by a cam 43 mounted upon the longitudinally extending shaft 44 journaled below the bed of the machine. The shaft 44 has chain and sprocket connection 45 with the heretofore described shaft 22. The parts are arranged to so coöperate that, while the block supporting the unflanged box or cover is traveling to position below the glue receiving plate 41 the gluing roller 27 will be carried from the glue receptacle across the underface of the plate 41 and then back from under said plate. The shaft 44 will then be actuated to turn the cam out of engagement with the arm 40, allowing the plate 41 to drop upon the top of the unflanged box or cover and deposit the glue thereon, the continued turning of the shaft causing the cam to engage and raise the arm 40 with its supported glue depositing plate.

From the gluing mechanism the block is carried forward one step to the flange delivery mechanism shown particularly in Figs. 5 and 16 to 26. Supported upon the framework at one side of the machine is an open top and open bottom receptacle 46 for holding a superimposed plurality of box flanges 47. Horizontally adjustable within the holder are side, front and rear centering devices 48, 49, and 50. Each of the centering devices extends downwardly within the holder and at its upper end is formed with an outwardly extending portion 51 formed with slots 52 through which suitable screws 53 are adapted to be passed into the adjacent framework of the holder. The lower ends of the side and rear guides of the centering devices are formed with inwardly extending flanges supporting lips 54 and 55 for the box flanges.

For the purpose of shoving the lowermost box flange outwardly over the adjacent box or cover supporting block and depositing said flange upon the unflanged box or cover 56 I provide the following parts: Slidable through the bottom of the flange holder is a delivery slide 57, said slide being outwardly tapered and being adjustably supported upon a cross bar 58 by means of the adjusting screw 59. The cross bar at its ends is supported in longitudinally extending slots 60 in the lower ends of lever arms 61, the upper ends of the lever arms having fulcrum support 62 upon the sides of the holder. The upper ends of the lever arms 61 are formed with downward and outward crank extensions 63 connected by rods 64 with eccentrics 65 secured upon the shaft 34.

Extending transversely above the bed of the machine in line with the sides of the flange holder are rotatably supported tumbler rails 66, each formed upon its inner side with a groove 67, and each rail supporting a disk 68 at its outer end.

In Fig. 24 is represented a bearing box 69 for the outer end of each rail and in Fig. 25 is represented a bearing box 70 for the opposite end of the rails being formed with a groove 71 to coincide with the groove 67 in the rail. The disks 68 of the tumbler rails carry crank pins 72 fitting in the horizontal slots 73 of the vertically slidable plate 74, the plate 74 being slidable in a suitable bracket 75. The plate 74 is reciprocated through the medium of rods 76 connecting said plate with eccentrics 77 supported upon the shaft 44. The delivery slide 57 in its outward movement slides through an opening 78 in the lower end of the centering device 50 and at its forward end is preferably formed with grooves 79 to receive the lowermost flange.

The parts are adjusted to so operate that the delivery slide will be carried behind the flanges in the holder, the relative thicker front of the slide raising the flanges until the slide is carried beyond them, when the flanges will drop and the lowermost flange stand in front of the groove in the slide. The continued operation will carry the slide forward, as shown in Fig. 17, to carry the lowermost flange into the grooves of the tumbler rails. The tumbler rails will then be rotated by the operating mechanism to drop the supported flange upon the unflanged box or cover.

From the flange delivery and depositing mechanism the operating mechanism will carry the blocks with the supported flanged box or cover under the pressure plate 80. The plate 80 is adjustably supported in the cross bars 81 through the medium of screws 82 threaded through said cross bars and provided with handles 83. The cross bars 81 are raised and lowered through the medium of the rods 84 and 85 connecting said cross bars with the eccentrics 86 and 87 mounted, respectively, upon the shaft 44 and a parallel shaft 88 journaled below the bed of the machine. The shaft 88 is rotated from the shaft 44 through the medium of sprocket and chain connection 89. Thus in the operation of the machine the rotating of the shaft 44 will cause the rotation of the shaft 88 and the lowering of the cross bars 81 to bring the plate 80 into engagement with the flange of the box or cover and press the flange and box or cover together to cause them to firmly adhere. The vertical adjustment of the plate 80 is utilized in regulating the height of the plate for different thicknesses of flanges.

C indicates an actuating handle for clutch mechanism, not shown, arranged in connection with the drive pulley 90 to pull the same into operative connection with the main shaft.

In the operation of the machine the unflanged box or cover 56 will be placed upon the block 8 at the feed end of the machine. The step by step operation of the machine will carry the block and supported unflanged box or cover into the position shown in Fig. 3. While coming to this position the roller 27 will first be actuated to be carried from the glue pot across the bottom face of the plate 41 and then back over the glue pot. The actuating of the cam 43 will then release the plate supporting arm allowing said plate to drop on the unflanged box or cover to deposit glue thereon, the further turning of the cam 43 then raising the plate 41 into the position shown in Fig. 3.

The continued step by step operation of the machine will carry the block into the position shown in Fig. 17. In this position the delivery wedge 57, standing behind the lowermost flange, will be actuated to shove said flange forwardly into the grooves of the tumblers 60, the delivery wedge then being carried back to withdrawn position. As the delivery wedge is carried underneath the flanges the thickened front end thereof will raise the flanges so that as the wedge passes beyond the flanges the flanges will drop to bring the lowermost flange in front of the delivery wedge ready for another operation. As soon as the delivery wedge is withdrawn the tumblers will be rotated by the heretofore described actuating mechanism to drop the supported flange upon the unflanged box or cover. The step by step operation of the machine will then carry the block and supported box or cover underneath the pressure plate 80. The plate will be lowered making the mechanism heretofore described press the flange tightly upon the box or cover to glue said parts together.

The different operating parts of the machine described are arranged to so coöperate that the supporting block will be carried by said step by step movement to the gluing mechanism, thence to the flange delivery mechanism and from there to the pressing mechanism. Similarly the operating mechanism for the gluing mechanisms is timed to properly coöperate with the step by step travel of the blocks. By means of the adjustable centering devices for the flange holding receptacle, flanges of different sizes may be employed.

I claim as my invention:

1. A machine of the class described comprising a carrier, means carried thereby for supporting a box or cover, means arranged along the path of travel of said carrier for applying glue to a supported box or cover, a flange supporting receptacle arranged along the path of travel of said carrier, guideways extending from said receptacle across said carrier, means for shoving a flange from said receptacle onto said guideways, and means for rotating said guideways to deposit a supported flange upon an underlying box or cover.

2. A machine of the class described comprising a carrier, means carried thereby for supporting a box or cover, means arranged along the path of travel of said carrier for applying glue to a supported box or cover, a receptacle for a superimposed plurality of flanges arranged along the path of travel of said carrier, guideways extending from said receptacle across said carrier, a slide below said receptacle, means for actuating said slide to shove the lowermost flange onto said guideways, and means for actuating said guideways to deposit a supported flange top upon an underlying box or cover.

3. A machine of the class described comprising a carrier, means carried thereby for supporting a box or cover, means arranged along the path of travel of said carrier for applying glue to a supported box or cover, a receptacle for a superimposed plurality of flanges arranged along the path of travel of said carrier, guideways extending from said receptacle across said carrier, a horizontally adjustable slide arranged below said receptacle, means for actuating said slide to shove the lowermost flange onto said guideways, and means for actuating said guideways to deposit a supported flange upon an underlying box or cover.

4. A machine of the class described comprising a carrier, means carried thereby for supporting a box or cover, means arranged along the path of travel of said carrier for applying glue to a supported box or cover, a receptacle for a superimposed plurality of flanges arranged along the path of travel of said carrier, horizontally adjustable flange centering guides arranged within said receptacle, a horizontally movable slide at the bottom of said receptacle, flange holding devices alongside said receptacle above said carrier, means for actuating said slide to carry the lowermost flange from said receptacle to said holders, and means for actuating said holders to deposit a supported flange upon an underlying box or cover.

5. A machine of the class described comprising an endless carrier, means carried thereby for supporting a box or cover, means arranged along the path of travel of said carrier for applying glue to a supported box or cover, a receptacle for a superimposed plurality of flanges arranged along the path of travel of said carrier, means for shoving the lowermost flange in said receptacle over an adjacent carrier supported box or cover and depositing the same upon said box or cover, and means for pressing said flange upon said box or cover, comprising a pressure plate adjustably supported above the carrier, and means for carrying said pressure plate into contact with an underlying box or cover.

In testimony whereof I affix my signature in presence of two witnesses.

SHERMAN T. BROWN.

Witnesses:
H. SWANSON,
WALTER D. MACLEITH.

Copies of this patent may be obtained for five cents each, by addressing the "Commissioner of Patents, Washington, D. C."